(12) United States Patent
Sudo

(10) Patent No.: US 7,826,871 B2
(45) Date of Patent: Nov. 2, 2010

(54) TRANSMISSION APPARATUS AND TRANSMISSION METHOD

(75) Inventor: Hiroaki Sudo, Kanagawa (JP)

(73) Assignee: Panasonic Corporation, Osaka (JP)

( * ) Notice: Subject to any disclaimer, the term of this patent is extended or adjusted under 35 U.S.C. 154(b) by 593 days.

(21) Appl. No.: 11/814,658

(22) PCT Filed: Jan. 24, 2006

(86) PCT No.: PCT/JP2006/301068

§ 371 (c)(1),
(2), (4) Date: Jul. 24, 2007

(87) PCT Pub. No.: WO2006/080317

PCT Pub. Date: Aug. 3, 2006

(65) Prior Publication Data

US 2009/0042519 A1 Feb. 12, 2009

(30) Foreign Application Priority Data

Jan. 25, 2005 (JP) .............................. 2005-017304

(51) Int. Cl.
*H04M 1/00* (2006.01)

(52) U.S. Cl. ................ 455/562.1; 455/575.7; 455/13.3; 455/10; 370/335; 375/260

(58) Field of Classification Search ............. 455/562.1, 455/575.7, 13.3, 10, 168.1; 370/335, 236, 370/208; 375/260, 267
See application file for complete search history.

(56) References Cited

U.S. PATENT DOCUMENTS 7,006,798 B2   2/2006 Miyoshi et al.

7,031,419 B2 *  4/2006 Piirainen ..................... 375/358
7,058,367 B1 *  6/2006 Luo et al. .................... 455/101

(Continued)

FOREIGN PATENT DOCUMENTS

EP      1271832 A1 *  1/2003

(Continued)

OTHER PUBLICATIONS

PCT International Search Report dated May 2, 2006 with English translation.

(Continued)

*Primary Examiner*—Minh D Dao
(74) *Attorney, Agent, or Firm*—Dickinson Wright PLLC

(57) ABSTRACT

There is provided a transmission device capable of preventing increase of retransmission information or encoding redundant bit and improving a throughput in a MIMO communication method. In this device, an encoding unit (130) subjects data transmitted from a first transmission antenna (110) and a second transmission antenna (120) each formed by a plurality of antennas, to encoding processing all at once. Modulation units (113, 123) modulate the data encoded by the encoding unit (130) for each of the first and the second transmission antennas (110, 120). Transmission units (115, 125) process the modulated data so that it can be transmitted from the corresponding first and the second antennas (110, 120). A transmission control unit (160) performs transmission control of the data transmitted from the respective antennas (110, 120). When retransmitting data, the transmission control unit (160) retransmits the data transmitted from a transmission antenna having a smaller number of antennas than the first and the second antennas (110, 120).

13 Claims, 15 Drawing Sheets

U.S. PATENT DOCUMENTS

| | | | |
|---|---|---|---|
| 7,230,928 B2 * | 6/2007 | Katz et al. | 370/252 |
| 7,324,792 B2 * | 1/2008 | Sim et al. | 455/101 |
| 7,397,864 B2 * | 7/2008 | Tarokh et al. | 375/299 |
| 7,450,489 B2 * | 11/2008 | Sandhu | 370/204 |
| 7,515,649 B2 * | 4/2009 | Shim et al. | 375/299 |
| 7,526,038 B2 * | 4/2009 | McNamara | 375/267 |
| 7,532,600 B2 * | 5/2009 | Hu et al. | 370/335 |
| 2003/0012318 A1 * | 1/2003 | Piirainen | 375/358 |
| 2003/0076787 A1 * | 4/2003 | Katz et al. | 370/252 |
| 2004/0233838 A1 | 11/2004 | Sudo et al. | |
| 2006/0018259 A1 * | 1/2006 | Kadous | 370/236 |
| 2006/0068825 A1 | 3/2006 | Iochi | |
| 2006/0114813 A1 * | 6/2006 | Seki et al. | 370/208 |

FOREIGN PATENT DOCUMENTS

| | | |
|---|---|---|
| JP | 200264424 | 2/2002 |
| JP | 200440232 | 2/2004 |
| JP | 200472427 | 3/2004 |
| JP | 2004112597 | 4/2004 |
| JP | 2004266739 | 9/2004 |
| JP | 2004320166 | 11/2004 |
| WO | 03/085869 A1 | 10/2003 |
| WO | 2005004376 | 1/2005 |

OTHER PUBLICATIONS

M. Inoue et al.: "Ayamari Kenshutsu Fugo o Mochiita MIMO-OFDM System no Kento", IEICE Technical Report CS2003-176, Mar. 8, 2004, pp. 105-110.

D. Kurose, et al., "A Studt of 0.9V CMOS Biguad Filter", CS2003-121, DSP2003-223 CS2003-173, Technical Report of IEICE, Mar. 2004, pp. 89-92.

Chinese Office action dated Mar. 25, 2010.

* cited by examiner $$\begin{Bmatrix} RX1 \\ RX2 \end{Bmatrix} = \begin{pmatrix} A & B \\ C & D \end{pmatrix} \begin{Bmatrix} TX1 \\ TX2 \end{Bmatrix}$$

$$\begin{Bmatrix} TX1 \\ TX2 \end{Bmatrix} = \frac{1}{AD-BC} \begin{pmatrix} D & -B \\ -C & A \end{pmatrix} \begin{Bmatrix} RX1 \\ RX2 \end{Bmatrix}$$

TRANSMISSION APPARATUS AND TRANSMISSION METHOD

TECHNICAL FIELD

The present invention relates to a transmitting apparatus and transmitting method of a MIMO (Multi-Input Multi-Output) communication scheme that transmits different signals from a plurality of antennas.

BACKGROUND ART

Conventionally, to improve the frequency use efficiency, a communication scheme is studied that transmits different signals from a plurality of antennas and obtains signals transmitted by interference compensating means upon reception. This communication scheme is generally referred to as a MIMO (Multi-Input Multi-Output) communication scheme.

FIG. 1 shows a basic schematic configuration diagram for illustrating basic operation of a conventional MIMO communication scheme that transmits different code-divided signals from a plurality of antennas. FIG. 1(a) illustrates a principle of MIMO communication. FIG. 1(b) shows an equation expressing the relationship between transmission signals and received signals. Furthermore, both the transmitting apparatus and receiving apparatus of the MIMO communication scheme shown in FIG. 1(a) have two antennas.

In FIG. 1, the signals transmitted from the antennas are referred to as TX1 and TX2. Further, the signals received by the antennas are referred to as RX1 and RX2. As shown in FIG. 1(b), RX1 and RX2 can be expressed by the following equations 1 and 2.

$$RX1 = ATX1 + BTX2 \quad \text{(Equation 1)}$$

$$RX2 = CTX1 + DTX2 \quad \text{(Equation 2)}$$

Here, A is a channel characteristics between transmitting antenna 1 and receiving antenna 1, B is a channel characteristics between transmitting antenna 2 and receiving antenna 1, C is a channel characteristics between transmitting antenna 1 and receiving antenna 2, and D is a channel characteristics between transmitting antenna 2 and receiving antenna 2.

Here, to receive transmission signals TX1 and TX2 from a received signal by estimating four channel characteristics A, B, C and D, using the estimated channel characteristics of four channel characteristics A, B, C and D and performing processing of the following equation 3, it is possible to receive signals TX1 and TX2 transmitted from the antennas.

$$DRX1/(AD-BC) - BRX2/(AD/BC) = \quad \text{(Equation 3)}$$
$$D(ATX1 + BTX2)/(AD - BC) -$$
$$B(CTX1 + DTX2)/(AD - BC) =$$
$$(ADTX1 + BDTX2 - BCTX1 - BDTX2)/(AD - BC) =$$
$$TX1$$

Non-Patent Document 1, for example, studies performing retransmission in such a MIMO communication scheme. Non-Patent Document 1 studies the following two retransmitting methods.

First, retransmitting method 1 collectively encodes data to be transmitted from the antennas and retransmits all data transmitted from all antennas.

FIG. 2 illustrates retransmitting method 1 in a MIMO communication scheme, and shows a frame configuration of data including retransmission data to be transmitted by a transmitting apparatus. As shown in FIG. 2, with retransmitting method 1, the retransmission information requires better quality than normal transmission data, and therefore a null signal is transmitted from another antenna when retransmission data is transmitted, so as to improve quality of the retransmission information.

Thus, when retransmitting the transmission signals, a transmitting apparatus of retransmitting method 1 transmits from all antennas all transmission signals which are collectively encoded and transmitted from all antennas.

Further, retransmitting method 2 performs encoding per data to be transmitted from the antennas and performs retransmission per antenna. This retransmitting method 2 can be implemented by using a transmitting apparatus having the same configuration as the transmitting apparatus of retransmitting method 1 other than the configuration of assigning transmission data per antenna and independently performing encoding processing on the transmission antenna per antenna. Non-Patent Document 1: "A Study of MIMO-OFDM with Error Detection Code System" IEICE Technical Report CAS2003-124, March 2004

DISCLOSURE OF THE INVENTION

Problems to be Solved by the Invention

However, above retransmitting method 1 of a MIMO communication scheme retransmits all data transmitted from all antennas as shown in the frame configuration of the transmission signal in FIG. 2, and therefore there is a problem that retransmission information becomes the equivalent times to the number of antennas (two times in the present embodiment) and throughput decreases significantly.

Further, although retransmitting method 2 of a MIMO communication scheme can reduce retransmission information, the redundant bits of coding upon retransmission becomes the equivalent times to the number of antennas (two times in the present embodiment). Therefore, throughput decreases significantly as with retransmitting method 1 shown by the frame configuration of FIG. 2.

It is therefore an object of the present invention to provide a transmitting apparatus and transmitting method capable of preventing an increase in retransmission information or redundant bits of coding in a MIMO communication scheme and improving throughput.

Means for Solving the Problem

The transmitting apparatus of the present invention employs a configuration, in a transmission apparatus of a MIMO communication scheme that simultaneously transmits different data from a plurality of antennas, including: an encoding section that collectively performs encoding processing on data to be transmitted from antennas of the plurality of antennas; a modulating section that performs modulation processing on the encoded data according to the plurality of antennas; a transmitting section that processes the modulated data so as to be transmitted from the corresponding antennas; and a transmission controlling section that controls transmission of the data transmitted from the antennas, wherein when the data is retransmitted, the transmission controlling section retransmits data transmitted from less antennas than the plurality of antennas.

Advantageous Effect of the Invention

As described above, according to the present invention, in a MIMO communication scheme, when data which is collectively encoded and simultaneously transmitted using a plurality of antennas, is retransmitted, it is possible to prevent an increase in retransmission information or redundant bits of coding and improve throughput in retransmission.

BEST MODE FOR CARRYING OUT THE INVENTION

Embodiment 1

The transmitting apparatus of Embodiment 1 of the present invention is a transmitting apparatus of a MIMO communication scheme that simultaneously transmits different data from a plurality of antennas having: an encoding section that collectively performs encoding processing on data to be transmitted from antennas of the plurality of antennas; a modulating section that performs modulation processing on the encoded data according to the plurality of antennas; a transmitting section that processes the modulated data so as to be transmitted from the corresponding antennas; and a transmission controlling section that controls transmission of the data transmitted from the antennas, wherein when the data is retransmitted, the transmission controlling section retransmits data transmitted from less antennas than the plurality of antennas. In Embodiment 1, upon retransmission, one transmitting antenna is used and only the transmission data transmitted from the one transmitting antenna is transmitted. This will be described in detail.

Figure 3:
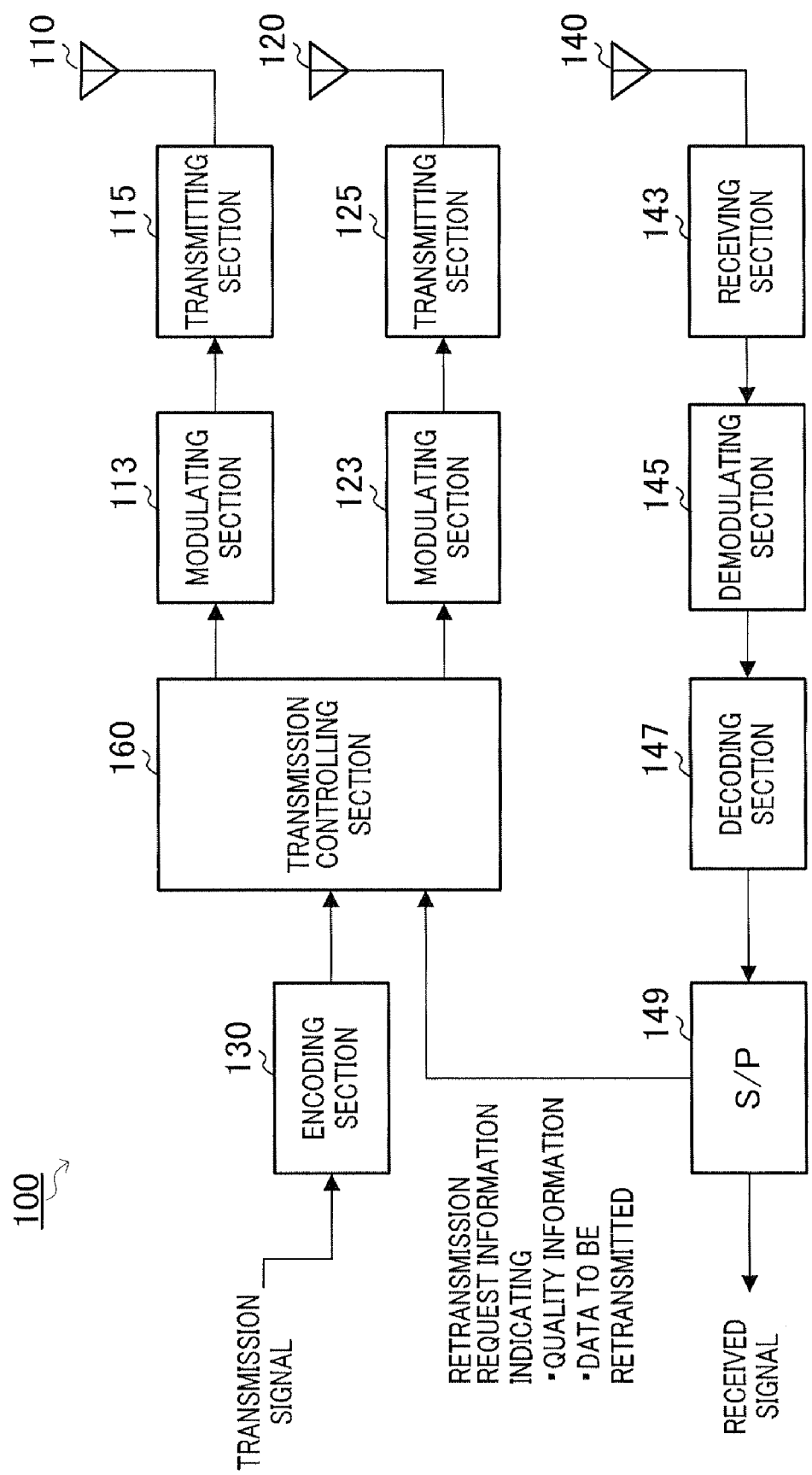
FIG. 3 is a block diagram showing a schematic configuration of a transmitting apparatus according to Embodiment 1 of the present invention.

FIG. 3 is a block diagram showing the schematic configuration of transmitting apparatus 100 according to Embodiment 1 of the present invention.

Transmitting apparatus 100 shown in FIG. 3 transmits different data from a plurality of transmitting antennas (here, first transmitting antenna 110 and second transmitting antenna 120), and has encoding section 130, modulating sections 113 and 123, transmitting sections 115 and 125, receiving antenna 140, receiving section 143, demodulating section 145, decoding section 147, S/P converting section (indicated by "S/P" in the figure) 149 and transmission controlling section 160.

Encoding section 130 collectively performs encoding processing on data to be transmitted—data transmitted from all antennas 110 and 112 (indicated as "transmission signal" in FIG. 3—and outputs encoded data to transmission controlling section 160.

Transmission controlling section 160 controls transmission of the encoded transmission data (transmission signal). To be more specific, transmission controlling section 160 stores transmission data encoded by encoding section 130, and, at a predetermined transmission time, outputs the data to modulating sections 113 and 123.

Further, transmission controlling section 160 uses retransmission information or information indicating data transmitted from which transmitting antenna is retransmitted reported by the communicating party and determines data transmitted from which transmitting antenna is retransmitted upon retransmission. Based on the result, transmission controlling section 160 performs control to retransmit predetermined transmission data from less transmitting antennas (here, one transmitting antenna) than the plurality of transmitting antennas out of the plurality of transmitting antennas (here, first and second transmitting antennas 110 and 120).

Here, for example, when encoding is performed independently per antenna as in retransmitting method 2 described as a prior art example, the retransmission information can be certainly reduced, but the redundant bits of coding become the equivalent times to the number of antennas and therefore throughput necessarily decreases significantly.

Modulating sections 113 and 123 perform modulation processing on the transmission data inputted from transmission controlling section 160 and output the result to transmitting sections 115 and 125. Furthermore, modulating sections 113 and 123 may independently set a modulation scheme (3GPP, TR25, 876) per antenna 110 and 120, or select the same modulation scheme for all antennas 110 and 120.

Transmitting sections 115 and 125 convert a frequency of the transmission data subjected to modulation processing to a radio frequency band, and outputs modulated data to first and second transmitting antennas 110 and 120. First and second transmitting antenna 110 and 120 transmit the transmission data subjected to frequency conversion by transmitting sections 115 and 125.

Receiving antenna 140 receives data transmitted from the communicating party and outputs the data to receiving section 143, and receiving section 143 converts a frequency of the inputted received data to a baseband signal and outputs the result to demodulating section 145.

Demodulating section 145 performs demodulation processing on the inputted received data after frequency conversion and outputs the demodulated data to decoding section 147. Decoding section 147 performs decoding processing on the received data inputted from demodulating section 145 and outputs the decoded data to S/P converting section 149.

S/P converting section 149 extracts retransmission information and information indicating data transmitted from which transmitting antenna is retransmitted (information of data to be retransmitted) reported by the communicating party, and inputs the information to transmission controlling section 160. That is, S/P converting section 149 sorts received data (received signal) and the retransmission request, quality information and information indicating data to be retransmitted reported by the communicating party.

Figure 4:
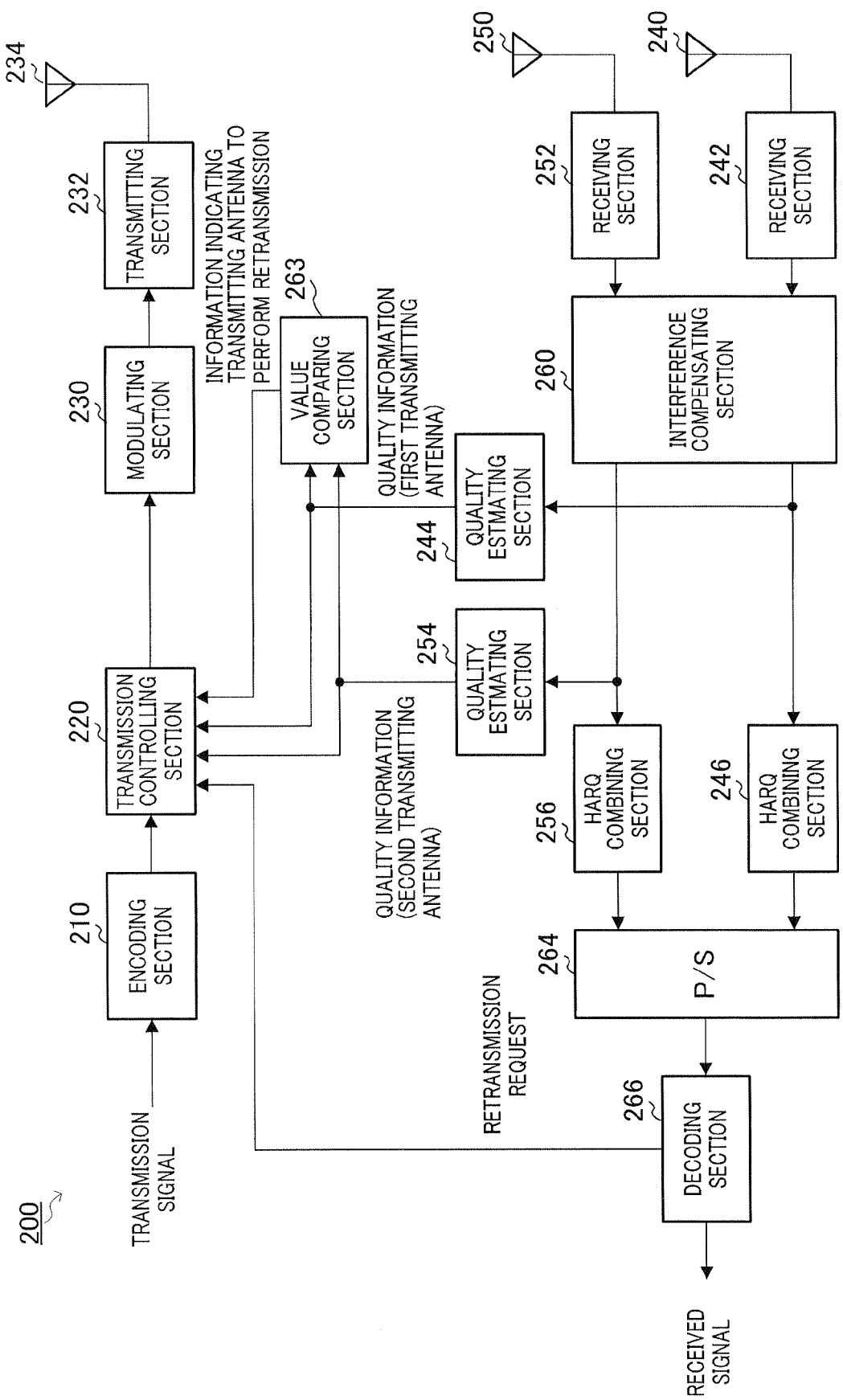
FIG. 4 is a block diagram showing a terminal apparatus, which is one example of a communicating party of a transmitting apparatus according to Embodiment 1 of the present invention.

FIG. 4 is a block diagram showing a terminal apparatus, which is one example of a communicating party of a transmitting apparatus according to Embodiment 1 of the present invention.

Terminal apparatus 200 shown in FIG. 4 has encoding section 210 that encodes data to be transmitted; transmission controlling section 220 that controls transmission of transmission data; modulating section 230 that performs modulation processing on transmission data; transmitting section 232 that converts a frequency to a radio frequency band; and transmitting antenna 234. Furthermore, terminal apparatus 200 has receiving antennas 240 and 250, receiving sections 242 and 252, interference compensating section 260, quality estimating sections 244 and 254, value comparing section 263, Hybrid ARQ (Hybrid Automatic Repeat ReQuest, hereinafter "HARQ") combining sections 246 and 256, P/S converting section (indicated by "P/S" in FIG. 4) 264 and decoding section 266.

Encoding section 210 performs encoding processing on the transmission signal and outputs encoded transmission signal data to transmission controlling section 220.

Transmission controlling section 220 controls transmission of the transmission signal transmitted by terminal apparatus 200, stores transmission data encoded by encoding section 210, and outputs stored data to modulating section 230 at a transmission time.

Further, transmission controlling section 220 performs transmission control based on the result of channel quality estimation performed per transmitting antenna 240 and 250 of communicating parties inputted from quality estimating sections 244 and 254, and information indicating whether or not there is an error in the received signal outputted by decoding section 266.

Modulating section 230 perform modulation processing on transmission data and outputs modulated data to transmitting section 232, and transmission data subjected to frequency conversion to a radio frequency band by transmitting section 232 is transmitted through transmitting antenna 234.

Receiving antennas 240 and 250 receive data transmitted from a communicating party (here, transmitting apparatus 100), and output data to the corresponding receiving sections 242 and 252.

Receiving sections 242 and 252 converts a frequency of the received data, which is a radio frequency band signal received by receiving antennas 240 and 250, obtains a baseband signal and outputs the obtained signal to interference compensating section 260.

Interference compensating section 260 subjects the received signal converted to a baseband signal to interference compensating processing, and outputs data transmitted per transmitting antenna of the communicating party to quality estimating sections 244 and 254 and HARQ combining sections 246 and 256.

Quality estimating sections 244 and 254 perform quality estimation per first and second transmitting antennas 110 and 120 of the communicating party, and output the quality estimation result to transmission controlling section 220 and value comparing section 263.

Figures 1A, 1B:
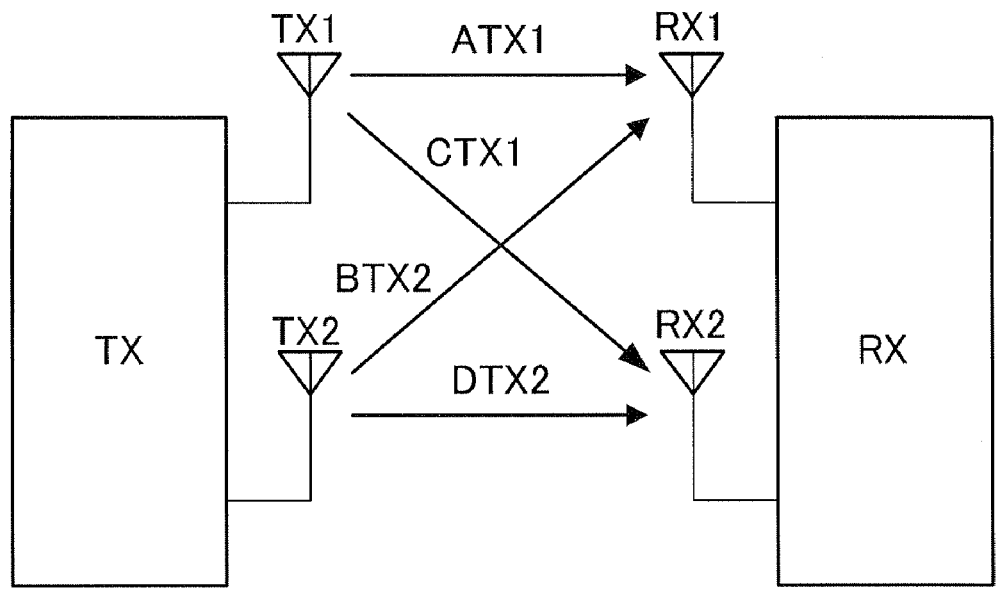
FIG. 1A is a basic schematic configuration diagram illustrating basic operation of a conventional MIMO communication scheme and illustrating a principle of MIMO communication.
FIG. 1B is a basic schematic configuration diagram illustrating basic operation of a conventional MIMO communication scheme, and is an equation expressing the relationship between transmission signals and received signals.
Figure 2:
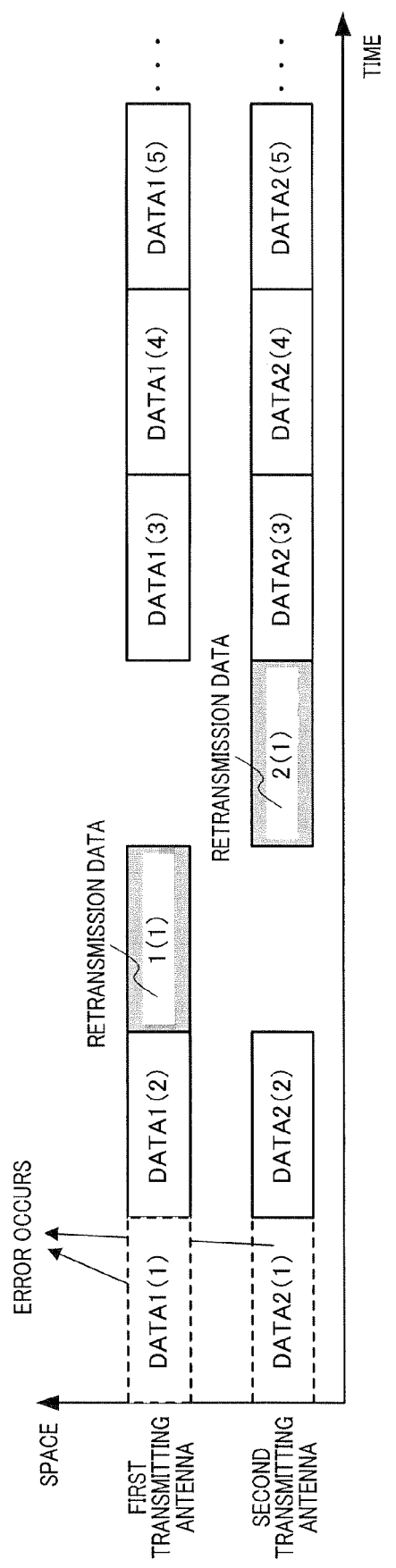
FIG. 2 shows a frame configuration of data including retransmission data transmitted by a transmitting apparatus of a conventional MIMO communication scheme.

The channel quality estimation methods performed by quality estimating sections 244 and 254 can perform calculation from four channel estimation results, when transmitting apparatus 100 has two transmitting antennas and terminal apparatus 200 has two receiving antennas as in the present embodiment. For example, quality information of first transmitting antenna 110 is calculated using channel estimation results A, B, C and D of the four systems of FIG. 1. Quality information of first transmitting antenna 110 may be set as |A|+|C|, and quality information of second transmitting antenna 120 may be set as |B|+|D|. Furthermore, the quality estimation method indicated here is only one example, the present invention is not limited to these quality estimation results and arbitrary quality estimation methods may be used.

Value comparing section 263 compares values of the quality estimation results inputted from quality estimating sections 244 and 254, and outputs the calculated value comparison result to transmission controlling section 220. This value comparison result is information indicating which of data transmitted from first antenna section 110 and second antenna section 120 of the communicating party is transmitted. Communication controlling section 220, based on the value comparison result, determines retransmission of which data is requested to the communicating party (here transmitting apparatus 100) that is, which data is made transmitted from the communicating party.

HARQ combining sections 246 and 256 combine the data inputted from interference compensating section 260—data transmitted per first and second transmitting antennas 110 and 120 of the communicating party—with the previously transmission data, and output the combined data to P/S converting section 264.

Further, HARQ combining sections 246 and 256 combine only retransmission data and output input data as is for the data of the transmitting antenna of the communicating party (transmitting apparatus 100) which is not retransmitted.

P/S converting section 264 P/S converts data inputted from HARQ combining sections 246 and 256, and outputs converted data to decoding section 266.

Decoding section 266 performs decoding processing on data subjected to P/S conversion by P/S converting section 264, and, when there is an error in the received signal, outputs a retransmission request signal to transmission controlling section 220. Upon receipt of the retransmission request signal, transmission controlling section 220 transmits the retransmission request signal to transmitting apparatus 100.

Next, operation of a transmitting system of transmitting apparatus 100 will be described.

In transmitting apparatus 100 shown in FIG. 3, the transmission signal is first subjected to encoding processing collectively by encoding section 130 as data to be transmitted from all antennas 110 and 120, and encoded transmission data is obtained. Next, encoded transmission data is stored in transmission controlling section 160, inputted to modulating sections 113 and 123 when a transmission time comes, and inputted to transmitting sections 115 and 125 after modulation processing. The transmission data after modulation processing inputted to transmitting sections 115 and 125 is subjected to frequency conversion to a radio frequency band and transmitted by antennas 110 and 120.

In terminal apparatus 200 shown in FIG. 4, data transmitted from the communicating party is received by receiving antennas 240 and 250, subjected to frequency conversion as a baseband signal, and inputted to interference compensating section 260 by receiving sections 242 and 252. The frequency converted signal is subjected to interference compensation by interference compensating section 260, and terminal apparatus 200 obtains data transmitted per transmitting antenna (here, first and second transmitting antennas 110 and 120 shown in FIG. 3) of the communicating party (here, transmitting apparatus 100 shown in FIG. 3).

Next, the data which is transmitted per transmitting antenna of the communicating party and subjected to interference compensation is combined with data previously transmitted by HARQ combining sections 246 and 256. These HARQ combining sections 246 and 256 combine only data retransmitted from transmitting apparatus 100 and output to P/S converting section 264 input data as is for the data of the transmitting antenna of the communicating party which is not retransmitted.

Data inputted to P/S converting section 264 is P/S converted, outputted to decoding section 266 and subjected to decoding processing by decoding section 266. When there is an error in the received signal, a retransmission request signal is outputted as the decoded signal to transmission controlling section 220, and transmission controlling section 220 transmits a retransmission request to transmitting apparatus 100 through modulating section 230, transmitting section 232 and transmitting antenna 234, based on the retransmission request signal.

At this time, the value comparison result calculated by value comparing section 263 is inputted to transmission controlling section 220 based on the result of quality estimation performed per first and second transmitting antennas 110 and 120 of the communicating party and which is inputted from quality estimating sections 244 and 254. Transmission controlling section 220 transmits this value comparison result to transmitting apparatus 100 as information indicating data transmitted from which transmitting antenna of the communicating party is transmitted.

Based on retransmission information and information indicating data transmitted from which transmitting antenna is retransmitted transmitted to transmitting apparatus 100, on the transmitting apparatus 100 side, retransmission control is performed by transmission controlling section 160, data transmitted from which transmitting antenna is retransmitted upon retransmission is determined, and determined data is transmitted by transmission controlling section 160.

This retransmission operation will now be described with reference to FIG. 5.

Figure 5:
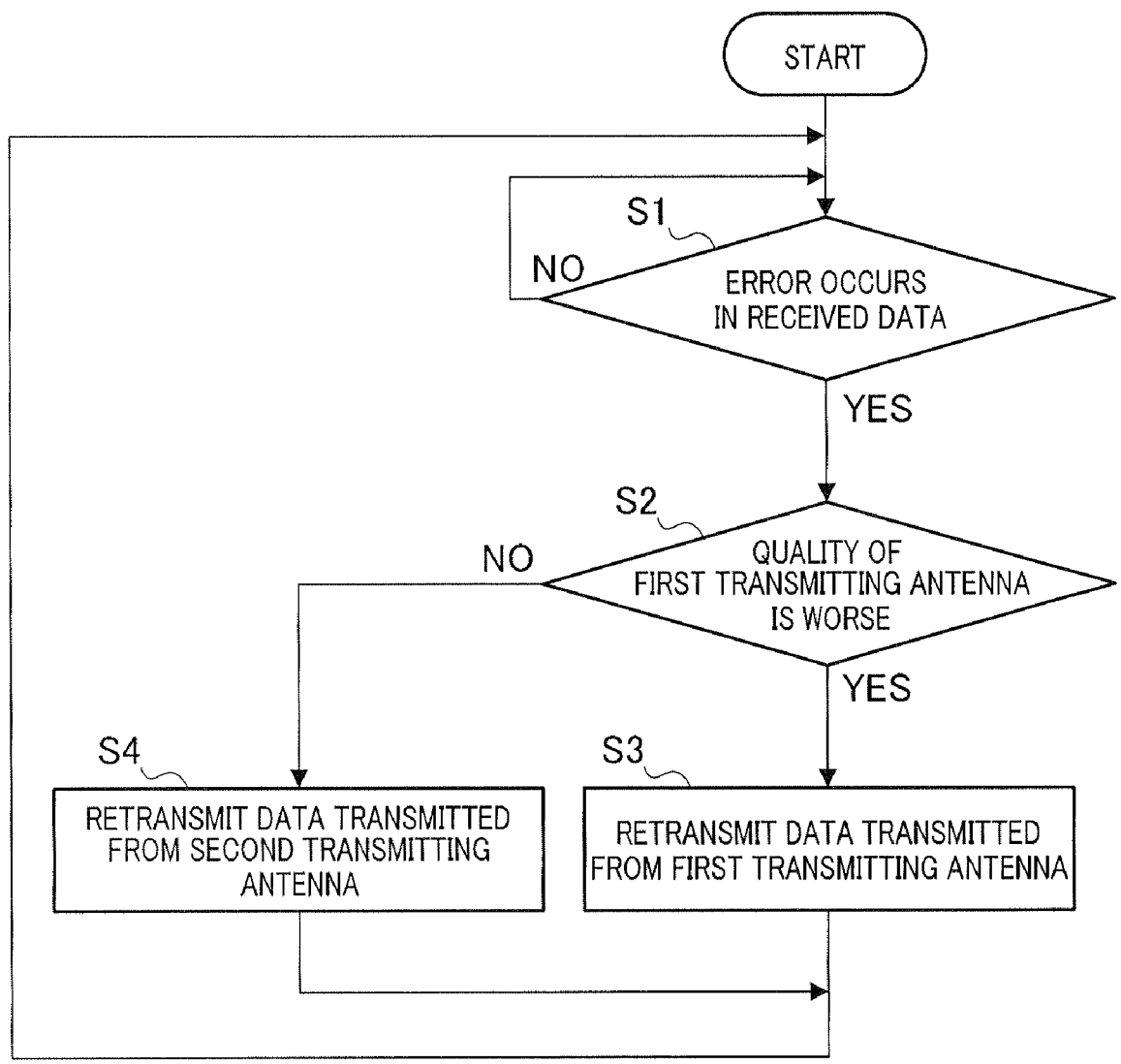
FIG. 5 is a flowchart illustrating a retransmitting processing performed in a transmitting apparatus according to the present invention.

FIG. 5 is a flowchart illustrating retransmitting processing performed in a transmitting apparatus of the present invention. The retransmitting processing shown in FIG. 5 retransmits only data transmitted from the transmitting antenna of transmitting apparatus 100 having the worst reception quality when the transmission signal is received in terminal apparatus 200, which is the communicating party.

As shown in FIG. 5, in step S1, it is determined whether or not there is an error in the received data, and then the flow proceeds to step S2.

In step 2, based on information indicating data to be retransmitted and quality information transmitted from terminal apparatus 200, it is determined which transmitting antenna transmits transmission data of poor quality. To be more specific, sequentially using as standard quality of transmission data from a predetermined antenna out of the plurality of transmitting antennas of the transmitting apparatus, quality of transmission data from the other transmitting antennas is compared, and the transmitting antenna that transmits best quality transmission data is determined.

Here, first transmitting antenna 110 and the other transmitting antenna (second transmitting antenna 120) are compared, and it is determined whether or not quality of transmission data transmitted from first transmitting antenna 100 is worse than quality of transmission data transmitted from the other transmitting antenna. In step S2, the flow proceeds to step S3 when quality of first transmitting antenna 110 is determined worse, or the flow proceeds to step S4 when quality of transmission data from first transmitting antenna 110 is good. That is, when quality of first transmitting antenna 110 is worse, second transmitting antenna 120 is determined as the transmitting antenna that transmits good quality transmission data.

On the other hand, when first transmitting antenna 110 has better quality than the other transmitting antenna (second transmitting antenna 120), it is determined that first transmitting antenna 110 transmits data of better quality than second transmitting antenna 120, and first transmitting antenna 110 is determined as the antenna that transmits better quality transmission data.

In step S3, when the reception quality of transmission data from first transmitting antenna 110 is poor, data transmitted from first transmitting antenna 110 is retransmitted.

Figure 6:
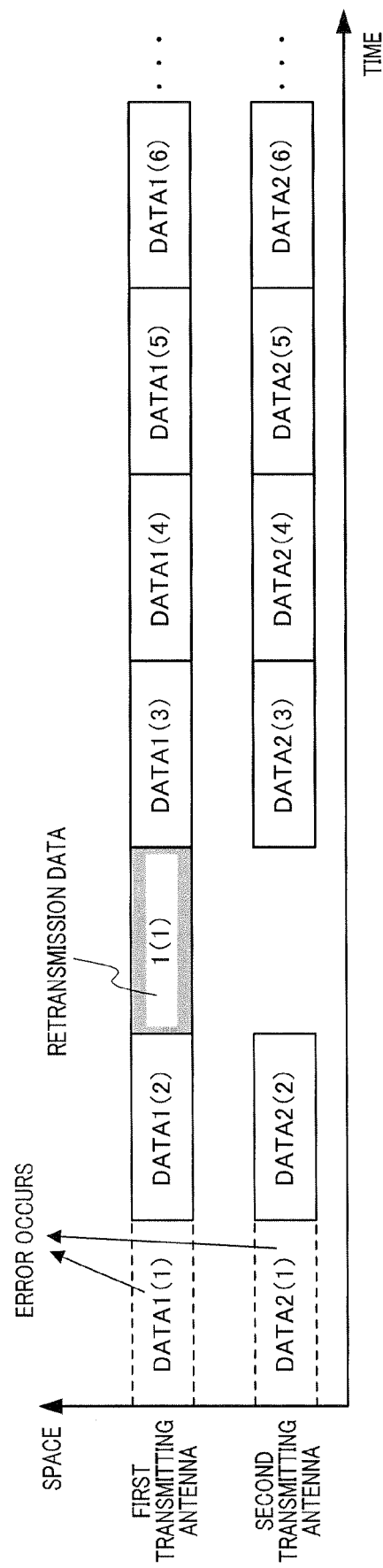
FIG. 6 shows a frame configuration when quality of a first transmitting antenna is worse in Embodiment 1.

FIG. 6 shows a frame configuration when the quality of first transmitting antenna 110 of transmitting apparatus 100 according to Embodiment 1 is worse.

As shown in FIG. 6, when quality of first transmitting antenna 110 is worse—when the reception quality of the transmission data from first transmitting antenna 110 is worse than the reception quality of the transmission data from second transmitting antenna 120—, only data transmitted from one transmitting antenna (data indicated by data 1 (1) in FIG. 6) is retransmitted, and the flow proceeds to step S1.

Figure 7:
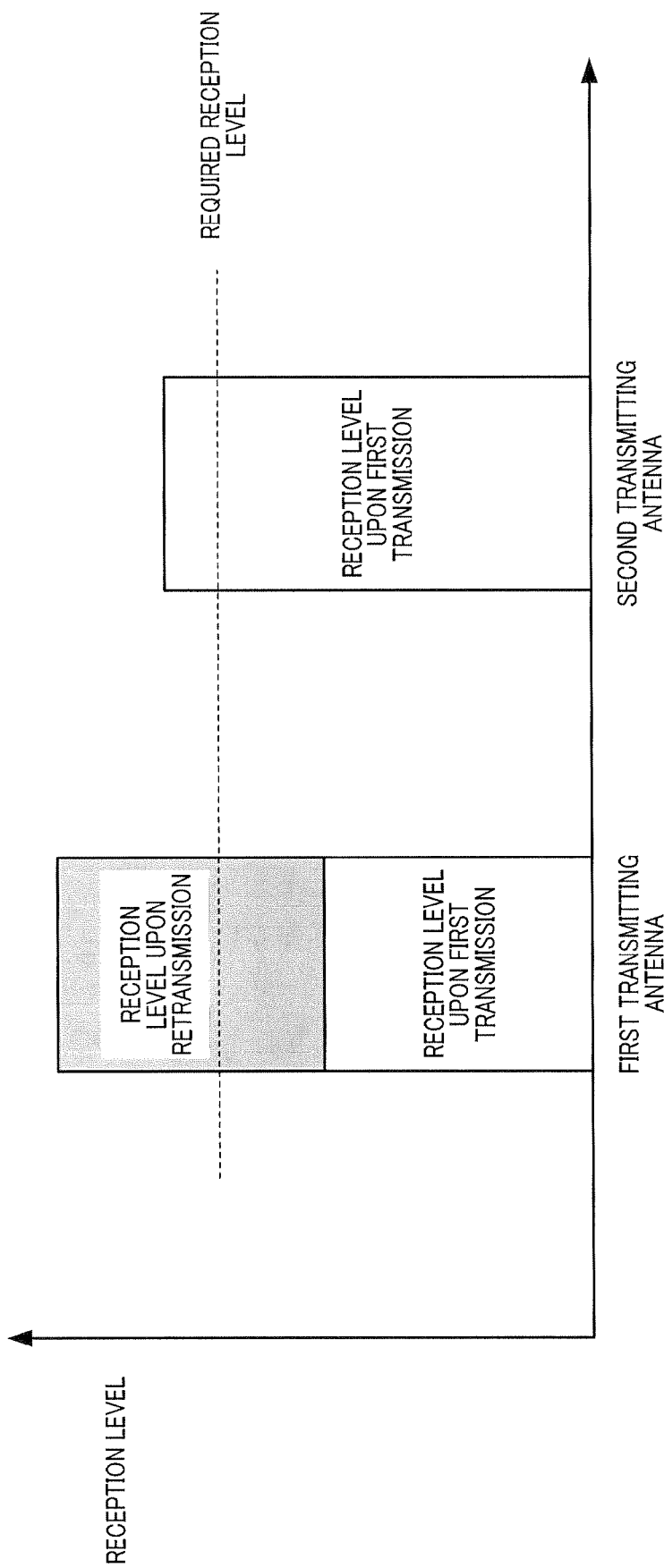
FIG. 7 shows a reception level when only data transmitted from the first transmitting antenna is retransmitted.

FIG. 7 shows the reception level when transmitting apparatus 100 according to Embodiment 1 retransmits only data transmitted from first transmitting antenna 110.

As shown in FIG. 7, transmitting apparatus 100 (see FIG. 3) retransmits only data transmitted from first transmitting antenna 110, and thereby it is possible to achieve the reception level required by all transmitting antennas (here, both first and second transmitting antennas 110 and 120).

In this way, in the present embodiment, unlike prior art, data transmitted from all transmitting antennas is not retransmitted, and therefore retransmission information does not become the equivalent times to the number of antennas and throughput does not decrease significantly.

Figure 8:
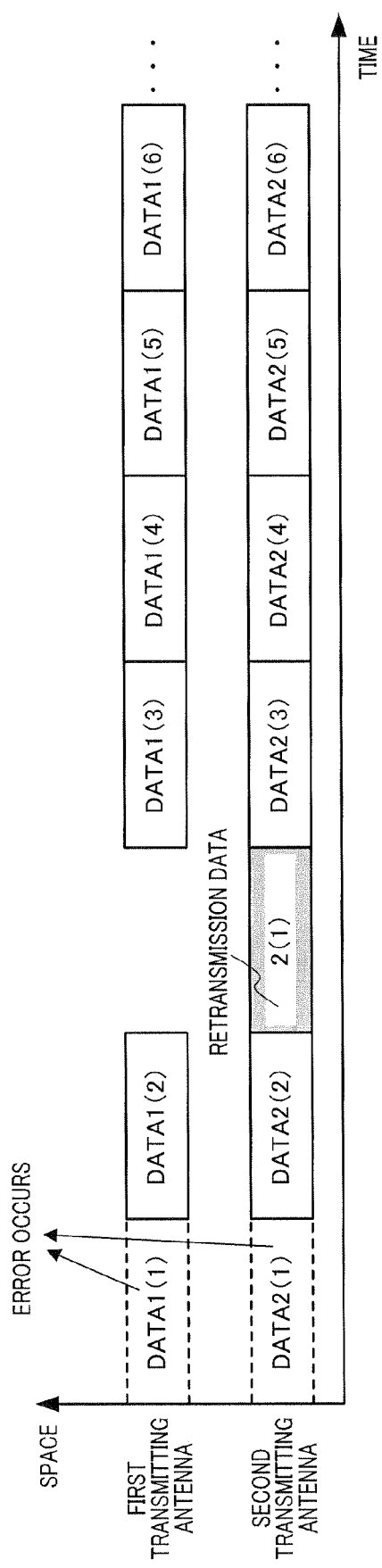
FIG. 8 shows a frame configuration when quality of second transmitting antenna is worse in Embodiment 1.

FIG. 8 shows a frame configuration when quality of second transmitting antenna 120 is worse.

As shown in FIG. 8, when quality of second transmitting antenna 120 is worse—when the reception quality of transmission data from second transmitting antenna 120 is worse than the reception quality of transmission data from first transmitting antenna 110—, only data transmitted from second transmitting antenna 120 is retransmitted.

Figure 9:
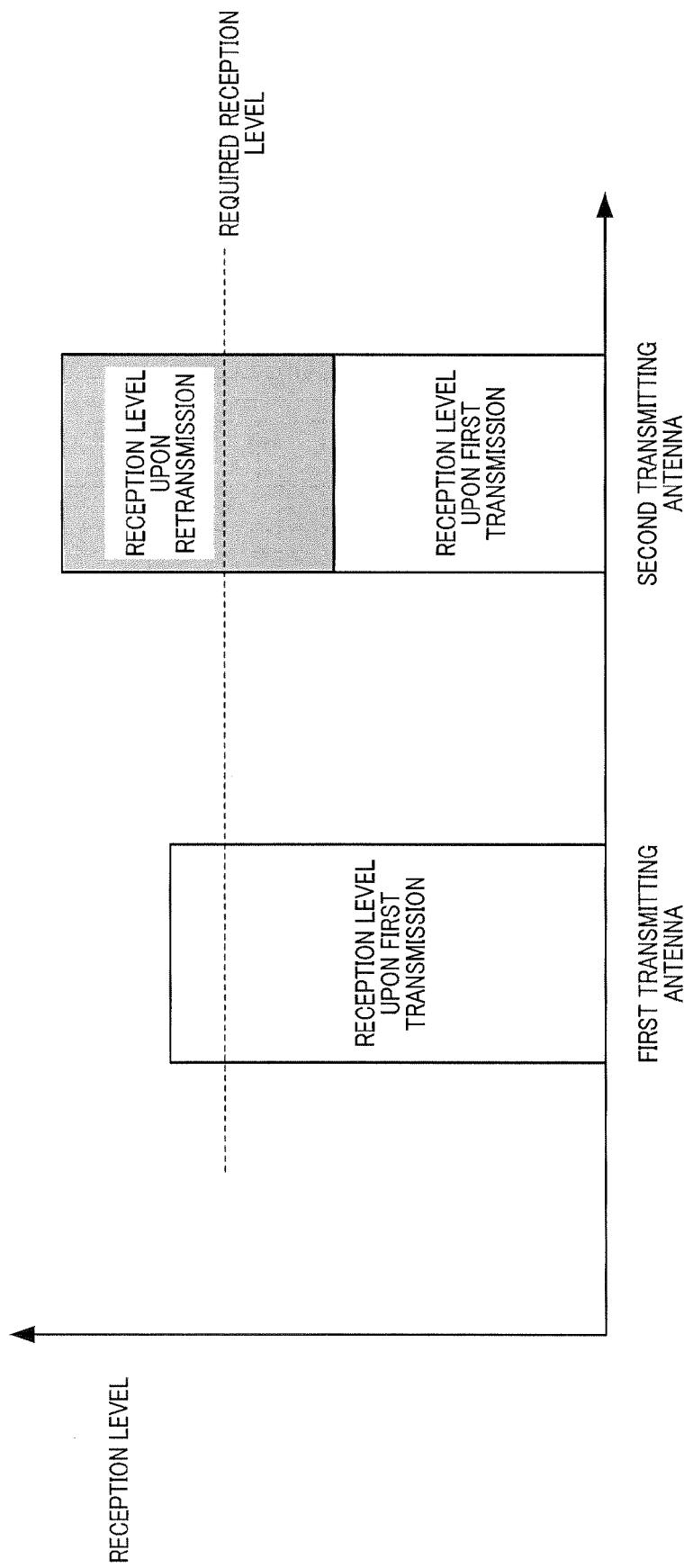
FIG. 9 shows a reception level when only data transmitted from the second transmitting antenna is retransmitted.

FIG. 9 shows the reception level when only data transmitted from second transmitting antenna 120 is retransmitted.

As shown in FIG. 9, transmitting apparatus 100 retransmits only data transmitted from second transmitting antenna 120, and it is thereby possible to achieve the reception level required by all transmitting antennas (here, both first and second transmitting antennas 110 and 120).

Furthermore, although transmitting apparatus 100 has two transmitting antennas in the present embodiment, the present invention is not limited to this and transmitting apparatus 100 may have a plurality of transmitting antennas.

For example, when transmitting apparatus 100 has four transmitting antennas, it is possible to retransmit only data transmitted from one antenna that first transmits transmission data having the worst quality, in addition, it is possible to select two antennas having the worst quality and retransmit data transmitted from these two antennas.

In transmitting apparatus 100 of the present embodiment, when transmission data is retransmitted, transmission controlling section 160 employs a configuration of retransmitting only data, out of data transmitted from transmitting antennas 110 and 120, transmitted from the antenna having the worst quality (first transmitting antenna 110, for example) upon reception in terminal apparatus 200, which is the communicating party.

According to this configuration, data from the other antenna (for example, second transmitting antenna 120) is not retransmitted upon retransmission, so that it is possible to prevent an increase in retransmission information or redundant bits of coding as the corresponding transmission data amount, and improve throughput.

Further, transmitting apparatus 100 of the present invention determines data to be retransmitted based on information that is transmitted from terminal apparatus 200, which is the communicating party, and that indicates data transmitted from which antenna is retransmitted. Furthermore, according to this configuration, it is possible to prevent deterioration of the error rate upon reception on the receiving side (here, terminal apparatus 200).

Embodiment 2

The transmitting apparatus according to Embodiment 2 of the present invention employs approximately the same configuration as transmitting apparatus 100 of Embodiment 1, and differs only in processing performed upon retransmission. Here, only the different processing will be described, and the advantage will not be described.

The transmitting apparatus according to Embodiment 2 uses the different transmitting antenna upon retransmission from the transmitting antenna used at first transmission, so that it is possible to prevent an error rate from occurring consecutively, particularly when channel fluctuation is slow.

Figure 10:
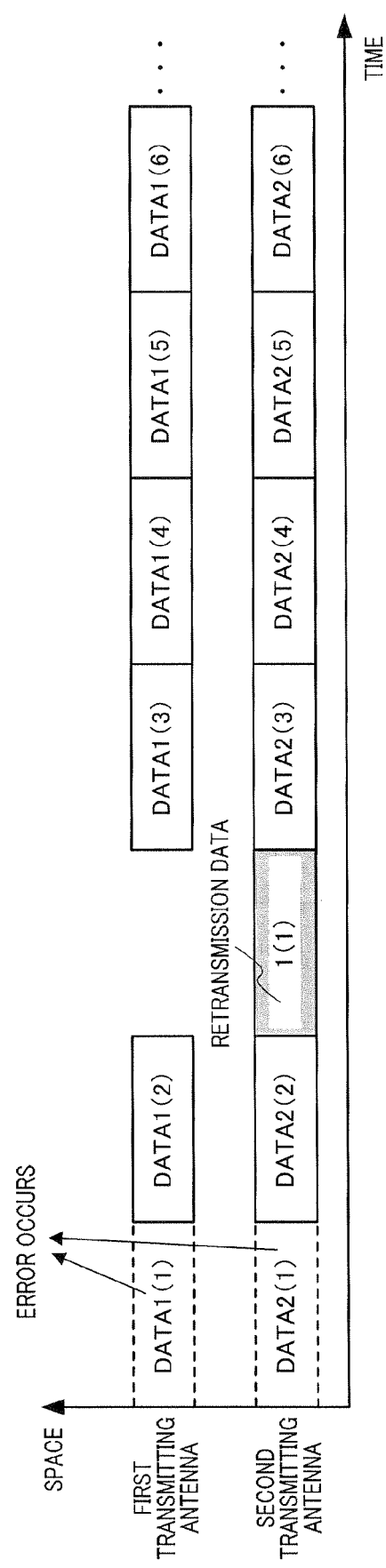
FIG. 10 shows a frame configuration of transmission data transmitted from a transmitting apparatus of Embodiment 2.

FIG. 10 illustrates an operation principle of a transmitting apparatus according to Embodiment 2 of the present invention, and shows a frame configuration of transmission data transmitted from the transmitting apparatus of Embodiment 2.

In the transmitting apparatus of Embodiment 2, transmission controlling section 160 (see FIG. 3) transmits data for which retransmission is requested, using a transmitting antenna other than the transmitting antenna used in transmitting data for which retransmission is requested.

FIG. 10 shows a case where, in the transmitting apparatus according to Embodiment 2 of the present invention, there is an error in data (data 1 (1) and data 2 (1) in FIG. 10) transmitted from first and second transmitting antennas 110 and 120, data information of the retransmission request transmitted from terminal apparatus 200 indicates data 1 (1), and, based on this request, data (data (1)) transmitted from first transmitting antenna 110 is retransmitted.

As shown in FIG. 10, data 1 (1) is transmitted from antenna 120 upon retransmission. Furthermore, when data transmitted from second transmitting antenna 120 is retransmitted, data is transmitted from antenna 110 upon retransmission.

When channel fluctuation is slow, for example, when quality of first transmitting antenna 110 is worse than second transmitting antenna 120, quality of antenna 110 may be worse upon retransmission. In this case, the transmitting apparatus of Embodiment 2 uses an antenna for retransmission other than the transmitting antenna used in first transmission, so that it is possible to prevent quality of the same data from becoming consecutively poor.

The transmitting apparatus of Embodiment 2 uses another transmitting antenna 120 for retransmission other than transmitting antenna 110 used in first transmission. That is, the transmission controlling section retransmits data to be retransmitted using an antenna other than the antenna used in previous transmission. According to this configuration, particularly when channel fluctuation is slow, it is possible to prevent the occurrence of a consecutive error.

Embodiment 3

The transmitting apparatus according to Embodiment 3 of the present invention has approximately the same configuration as transmitting apparatus 100 of Embodiment 1, and differs only in processing upon retransmission. Here, only the different processing will be described and the advantage will not be described.

The transmitting apparatus according to Embodiment 3, when second and subsequent retransmissions are performed, preferentially retransmits data which is not retransmitted, thereby further improving the error rate when Hybrid ARQ is performed in a HARQ combining section of a terminal apparatus compared to the case where the transmitting apparatus of Embodiments 1 or 2 is used.

Figure 11:
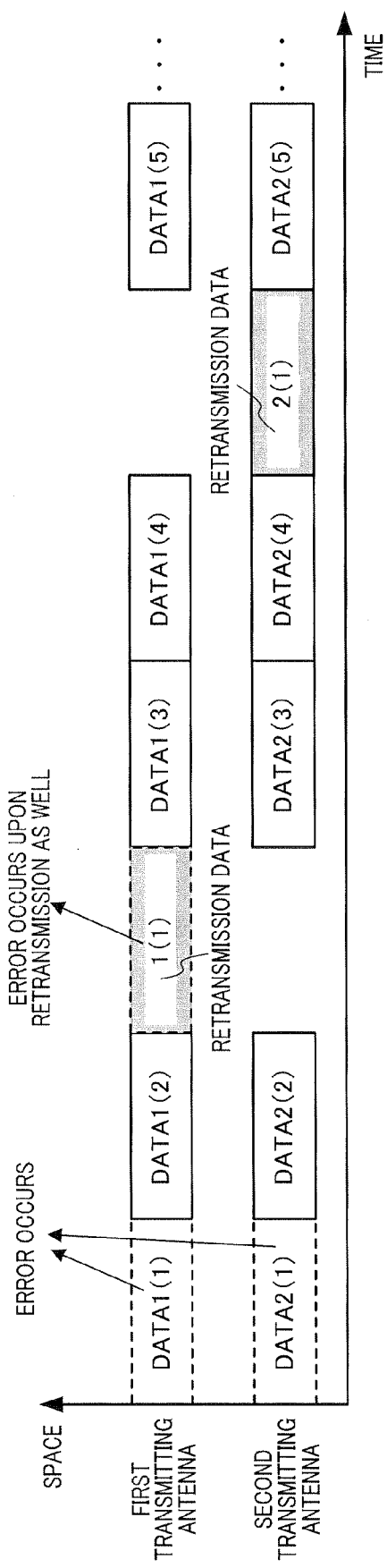
FIG. 11 shows a frame configuration of transmission data transmitted from a transmitting apparatus of Embodiment 3.

FIG. 11 illustrates an operation principle of a transmitting apparatus according to Embodiment 3 of the present invention, and shows a frame configuration of transmission data transmitted from the transmitting apparatus of Embodiment 3.

In the transmitting apparatus of Embodiment 3, transmission controlling section 160 of transmitting apparatus 100 shown in FIG. 3 retransmits transmission data based on information indicating retransmission requested data transmitted from the terminal apparatus, and, when the retransmission data is again retransmitted—when second and subsequent retransmissions are performed—, determines to preferentially retransmit another transmission data that is not retransmitted using a predetermined transmitting antenna.

FIG. 11 shows a transmitting apparatus according to Embodiment 3 of the present invention where there is an error even when data 1 (1) transmitted from first transmitting antenna 110 is retransmitted, and upon second transmission, data 2 (1) transmitted from the other second transmitting antenna 120 is retransmitted at the same time as data 1 (1) where there is an error. Furthermore, when there is an error after retransmitting data transmitted from second transmitting antenna 120, upon second retransmission, data transmitted from the other transmitting antenna (here, data transmitted from first transmitting antenna 110) is retransmitted at the same time as data is retransmitted where there is an error.

In this way, transmission controlling section 160 (see FIG. 3), when second and subsequent retransmissions are performed, preferentially retransmits data that is not retransmitted.

As a result, it is possible to improve an error rate when Hybrid ARQ processing is performed in a HARQ combining section. Further, when there is still an error after retransmission, it is possible to improve quality of data. That is, it is possible to prevent failure of improvement of overall quality that is not retransmitted due to the predominant data having the poor reception quality, even when retransmission data is further retransmitted.

In the transmitting apparatus of Embodiment 3, when second and subsequent retransmissions are performed, the transmission controlling section preferentially retransmits data that is not retransmitted. According to this configuration, when MIMO communication is carried out, it is possible to further improve the error rate when Hybrid ARQ is performed on the receiving side compared to the case where a transmitting apparatus according to Embodiments 1 to 4 is used.

Embodiment 4

The transmitting apparatus according to Embodiment 4 of the present invention has approximately the same configuration as transmitting apparatus 100 of Embodiment 1, and differs only in processing performed upon retransmission. Here, only the different processing will be described.

The transmitting apparatus according to Embodiment 4 adaptively changes the data amount to be retransmitted based on a modified quality, and thereby further improves throughput compared to the transmitting apparatus of Embodiments 1 to 3 even when the channel quality is poor.

Figure 12:
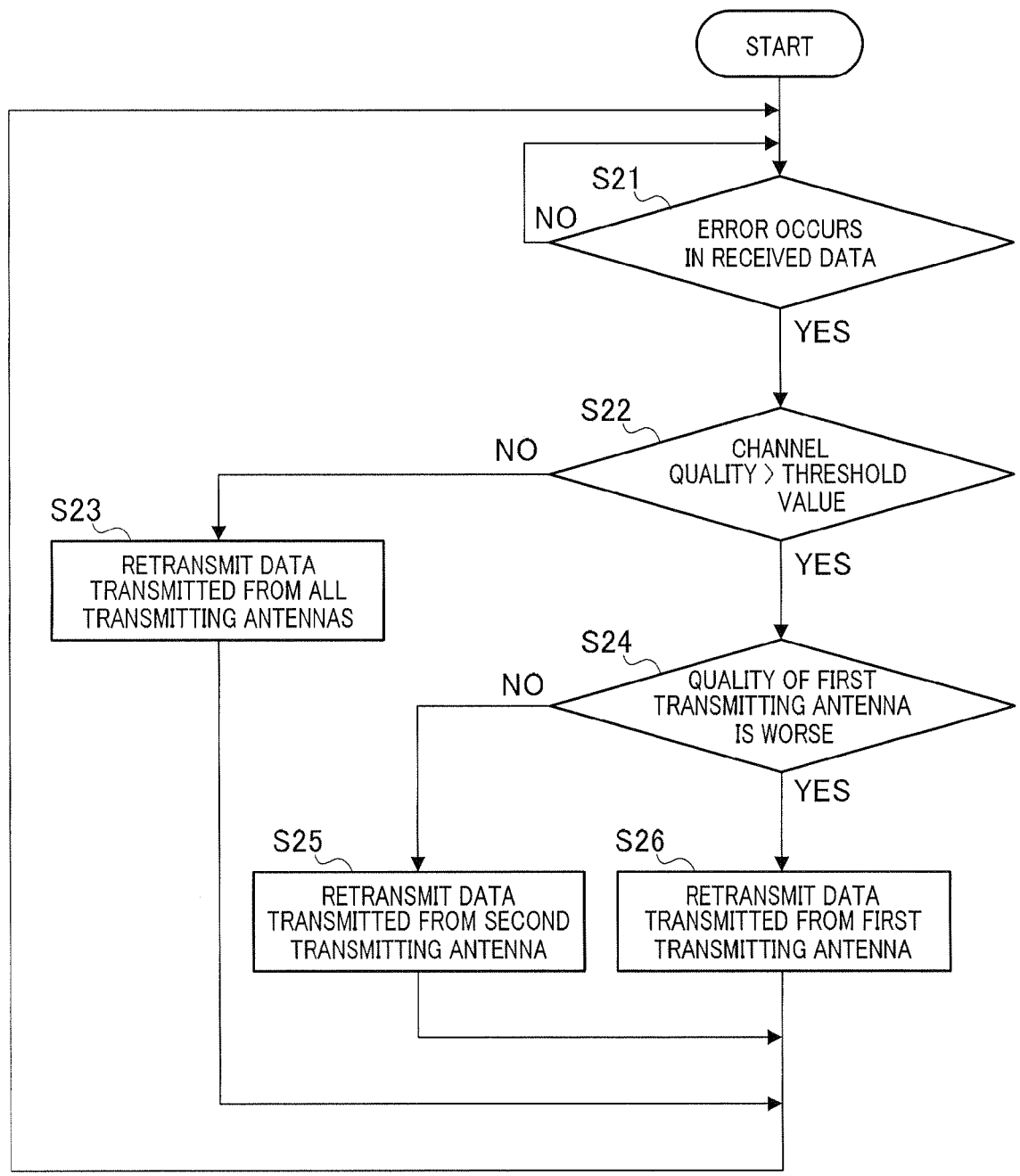
FIG. 12 is a flowchart showing an operation principle of a transmitting apparatus according to Embodiment 4 of the present invention.

FIG. 12 is a flowchart showing an operation principle of a transmitting apparatus according to Embodiment 4 of the present invention.

As shown in FIG. 12, in step S21, it is determined whether or not there is an error in received data, and, when there is an error, the flow proceeds to step S22.

In step S22, channel quality information of quality information transmitted from the receiving side (here, terminal apparatus 200) is compared with the threshold value set for determining the data amount to be retransmitted in advance. In step S22, the flow proceeds to step S23 when the channel quality is less than or equal to the threshold value, and the flow proceeds to step S24 when the channel quality is greater than the threshold value.

In step S23, transmission controlling section 160 determines that the data transmitted from all transmitting antennas is retransmitted, and retransmits the transmission data from all transmitting antennas (here, first and second transmitting antennas 110 and 120), and the flow returns to step S21.

Figure 13:
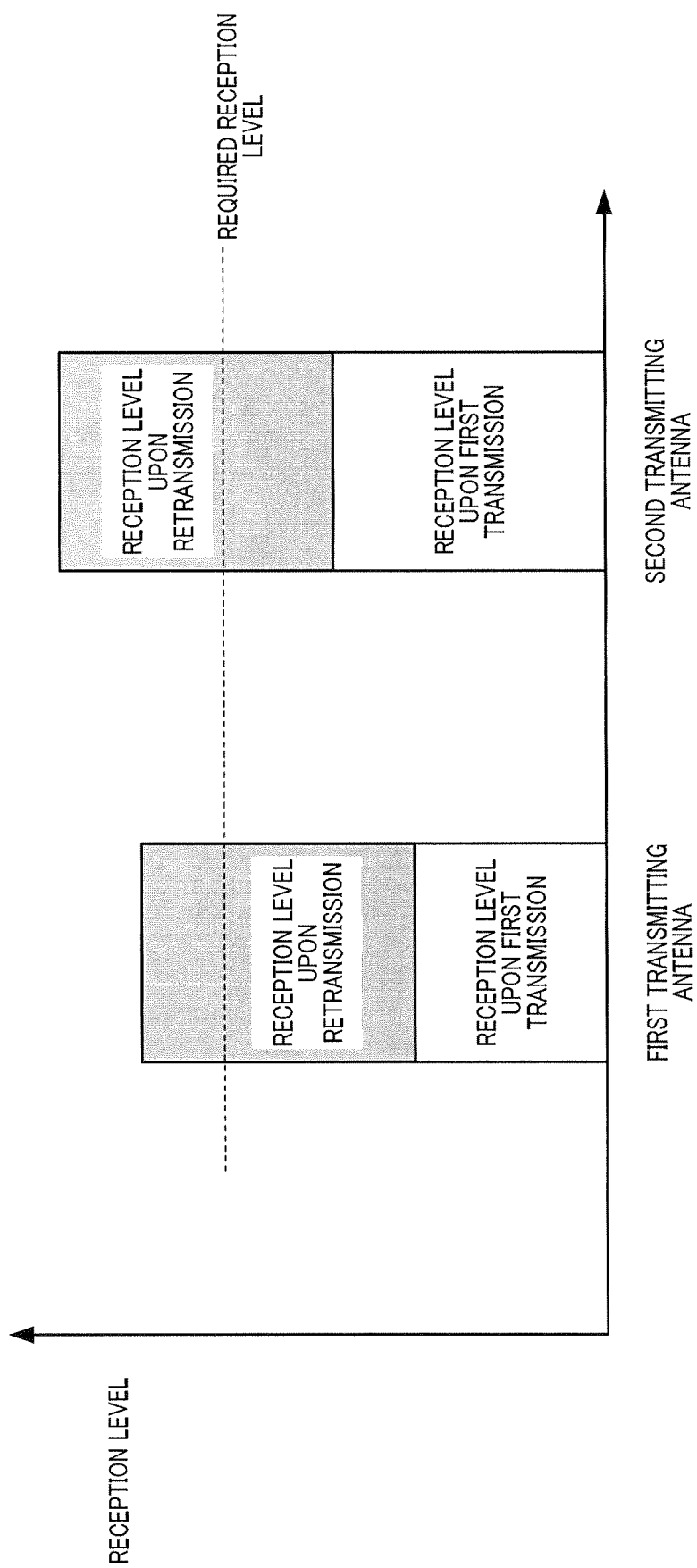
FIG. 13 shows a reception level when a channel quality is worse than a threshold value and data is retransmitted from a transmitting apparatus.

FIG. 13 shows the reception level when data is retransmitted from transmitting apparatus 100 (see FIG. 3) in a case where the channel quality is worse than the threshold value.

When the channel quality is poor and the reception quality of data transmitted from all antennas (for example, first transmitting antenna 110 and second transmitting antenna 120 shown in FIG. 3) is less than a predetermined reception level, it is highly likely to cause an error even when only data transmitted from transmitting antennas having the worst quality is retransmitted and the number of times of retransmission increases.

Therefore, as shown in FIG. 13, the transmitting apparatus according to Embodiment 4 adaptively changes the data amount to be retransmitted according to the modified quality. Thus, it is possible to further improve throughput when the channel quality is much poorer than Embodiments 1 to 3.

In step 24, based on information indicating data to be retransmitted and quality information transmitted from terminal apparatus 200, it is determined which transmitting antenna transmits transmission data of poor quality. To be more specific, sequentially using as standard quality of the transmission data from a predetermined transmitting antenna out of the plurality of transmitting antennas of the transmitting apparatus, quality of transmission data from the other transmitting antenna is compared, and the transmitting antenna other than the transmitting antenna that transmits the transmission data having the worst quality is determined.

Here, first transmitting antenna 110 and second transmitting antenna 120 are compared, and it is determined whether or not quality of transmission data of first transmitting antenna 110 is worse.

In step S24, the flow proceeds to step S25 when quality of first transmitting antenna 110 is determined better than quality of second transmitting antenna 120. On the other hand, the flow proceeds to step S26 when quality of first transmitting antenna 110 is determined worse than quality of second transmitting antenna 120. That is, when quality of first transmitting antenna 110 is better, quality of transmission data of first transmitting antenna 110 is determined better than second transmitting antenna 120, and first transmitting antenna 110 is determined as the antenna that transmits transmission data of good quality. On the other hand, when quality of first transmitting antenna 110 is worse, second transmitting antenna 120 is determined as the transmitting antenna that transmits transmission data of good quality.

In step S25, data transmitted from second transmitting antenna 120 is retransmitted, and the flow returns to step S21 and repeats the processing, and, in step S26, data transmitted from first transmitting antenna 110 is retransmitted, the flow returns to step S21 and repeats the processing.

In this way, the transmitting apparatus of Embodiment 4 retransmits only data transmitted from the transmitting antenna having the worst quality upon retransmission when the channel quality is greater than the threshold value, and retransmits all data transmitted from all transmitting antennas when the channel quality is worse than the threshold value. The transmitting apparatus according to Embodiment 4, compared to transmitting apparatus 100, differs only in retransmitting processing in transmission controlling section 160 and has approximately the same configuration and effects.

Transmission controlling section 160 (see FIG. 3) of the transmitting apparatus of Embodiment 4 adaptively changes the data amount to be retransmitted according to the modified quality based on the channel quality transmitted from terminal apparatus 200 (see FIG. 4). Here, the channel quality information is quality information reported by the communicating party.

Furthermore, the threshold value used in determining the data amount may be adaptively changed according to various communication conditions (such as, the number of users of a channel and a remaining battery level), rather than fixed threshold value. For example, when there are a lot of users using a channel, that is, there are a lot of terminal apparatuses, and one user is allowed to use a large number of bands, assignment to other users significantly decreases, and communication of other users is interfered. In this case, the method of setting a small threshold value and retransmitting only data transmitted from one transmitting antenna is effective.

Thus, in the transmitting apparatus of Embodiment 4, the transmission controlling section adaptively changes the data amount to be retransmitted according to the channel quality upon transmission. According to this configuration, it is possible to improve throughput when the channel fluctuation upon MIMO communication is worse than when communication is performed using the transmitting apparatus according to Embodiments 1 to 3.

Embodiment 5

When data requiring better quality than other data is transmitted from a specific transmitting antenna, the transmitting apparatus according to Embodiment 5 preferentially retransmits data requiring better quality.

Figure 14:
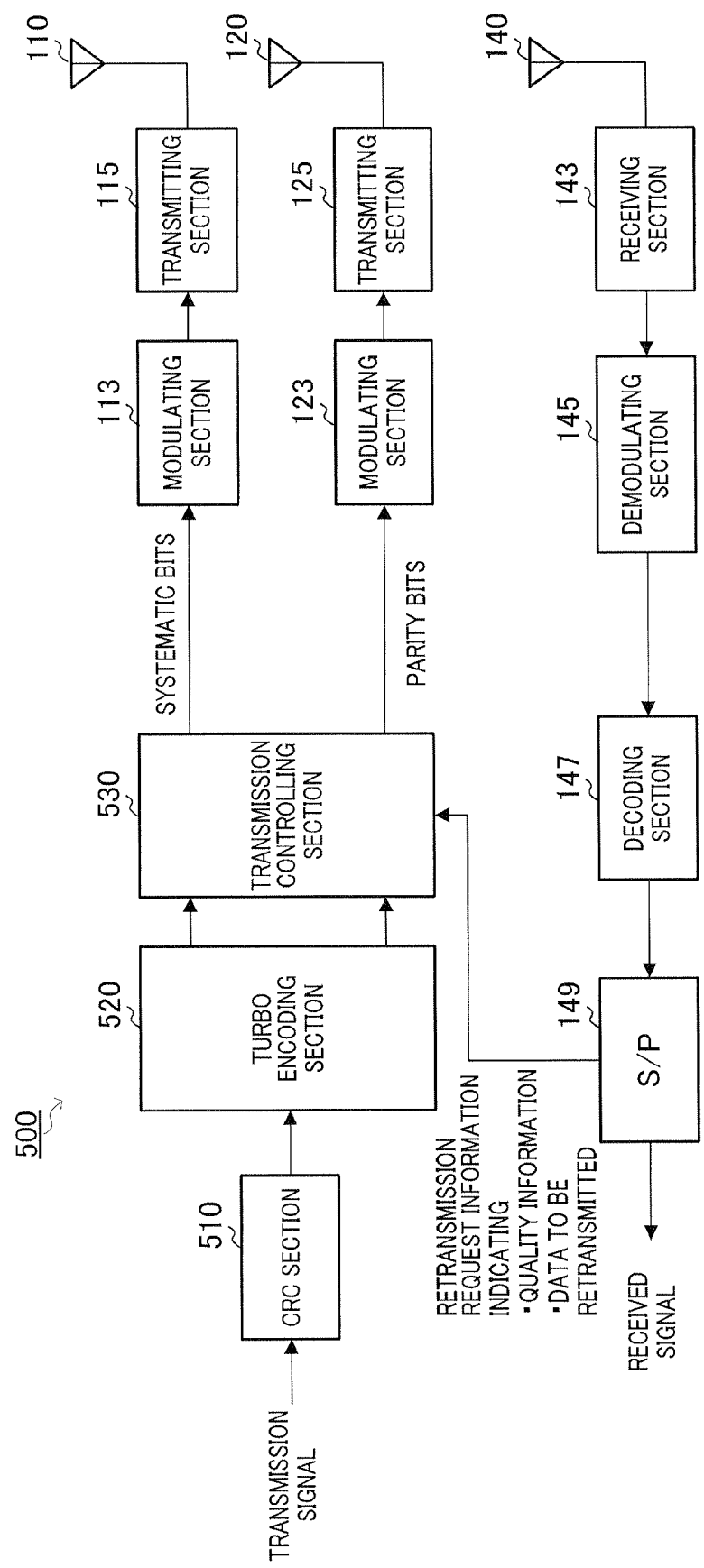
FIG. 14 is a block diagram showing a schematic configuration of a transmitting apparatus according to Embodiment 5.

FIG. 14 is a block diagram showing the schematic configuration of transmitting apparatus 500 according to Embodiment 5.

As shown in FIG. 14, transmitting apparatus 500 provides CRC (Cyclic Redundancy Check) section 510 and turbo encoding section 520 in place of encoding section 130 in the configuration of transmitting apparatus 100.

In transmitting apparatus 500, transmission data is subjected to CRC processing in the CRC section, and subsequently turbo encoding processing in turbo encoding section 520, and then inputted to transmission controlling section 530.

Transmission controlling section 530 performs transmission control to transmit critical information as data, such as systematic bits, from one transmitting antenna 110 and parity bits from the other transmitting antenna 120, and retransmit only the systematic bits regardless of quality of transmitting antennas 110 and 120 when performing retransmission.

Figure 15:
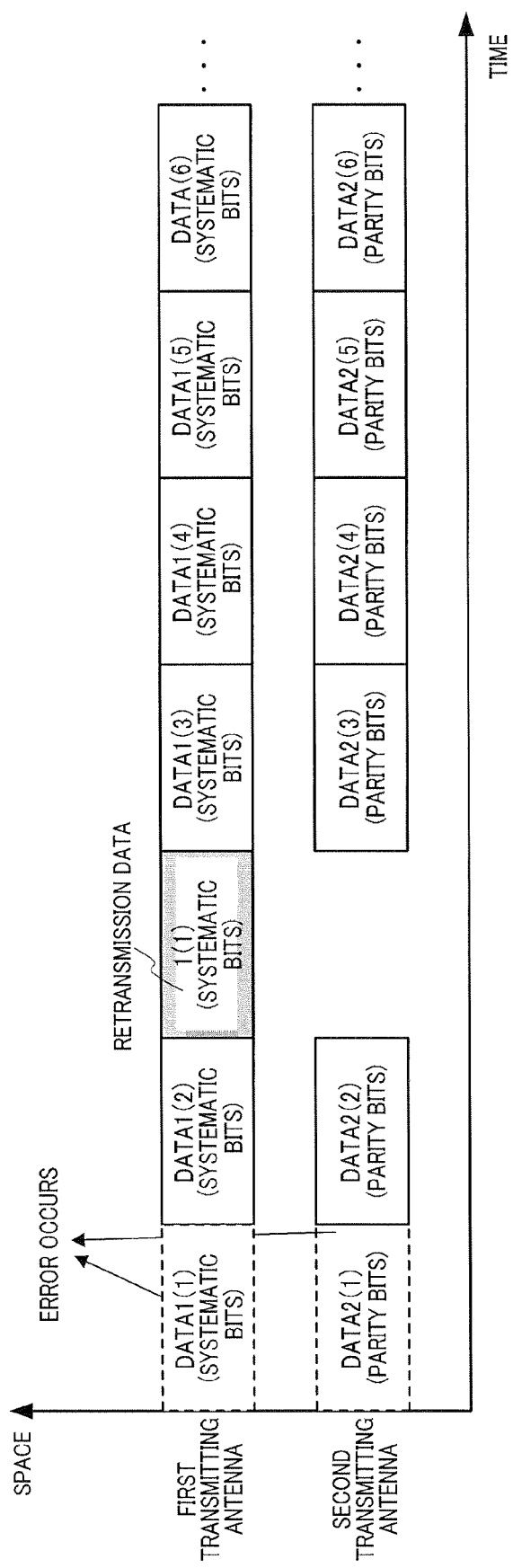
FIG. 15 shows a frame configuration of transmission data transmitted from a transmitting apparatus of Embodiment 5 according to the present invention.

FIG. 15 shows a frame configuration of transmission data transmitted from a transmitting apparatus of Embodiment 5 according to the present invention.

Critical information includes, for example, systematic bits when a turbo code is used as an error correcting code, retransmission information and information used for communication control (such as pilot signals). Here, the systematic bits when a turbo code is used as an error correcting code will be described as one example of critical information.

When systematic bits are transmitted from one antenna and parity bits are transmitted from the other antenna, in Embodiment 5 of the present invention, only the systematic bits are retransmitted regardless of quality of the transmitting antennas as shown in FIG. 15.

Although a case of systematic bits has been described as one example of critical information where a turbo code is used as an error correcting code, the present invention is not limited to this, and can be applied to cases where retransmission information and information used for communication control (such as pilot signals) are transmitted from a specific antenna.

In the transmitting apparatus according to the present embodiment, when data requiring the better quality than other data is transmitted from a specific antenna out of the plurality of antennas, the transmission controlling section preferentially retransmits data requiring better quality upon retransmission. Furthermore, here, data requiring better quality than other data is systematic bits when a turbo code is used.

According to this configuration, it is possible to further improve the error rate characteristics on the receiving side when a turbo code is used as an error correcting code compared to the transmitting apparatus according to Embodiments 1 to 4, so that it is possible to improve quality of data requiring better quality than other data.

Furthermore, although transmitting apparatus 100 of the embodiments has been described as a base station apparatus of a radio communication system, the present invention is not limited to this and may be provided in a mobile station apparatus. The present application is based on Japanese Patent Application No. 2005-17304, filed on Jan. 25, 2005, the entire content of which is expressly incorporated by reference herein.

INDUSTRIAL APPLICABILITY

The transmitting apparatus and transmitting method according to the present invention provide an advantage of preventing an increase in retransmission data or redundant bits of coding and improving throughput when retransmitting transmission data, and is useful when transmitting data in a MIMO communication scheme.

The invention claimed is:

1. A transmission apparatus of a multi-input multi-output (MIMO) communication scheme that simultaneously transmits different data from a plurality of antennas, the transmission apparatus comprising:
    an encoding section that collectively performs encoding processing on first data to be transmitted from each of the plurality of antennas;
    a modulating section that performs modulation processing on the encoded first data according to each corresponding antenna;
    a transmitting section that transmits the modulated first data from each corresponding antenna; and
    a transmission controlling section that controls transmission of the modulated first data to be transmitted from each of the plurality of antennas, wherein:
    when a data retransmission relating to the first data is performed, the transmission controlling section controls the data retransmission such that (i) not all of the first data previously transmitted from the plurality of antennas is included in the data retransmission and (ii) data included in the data retransmission excludes any part of the first data previously transmitted from at least one of the plurality of antennas.

2. The transmission apparatus according to claim 1, wherein the transmission controlling section controls the data retransmission such that a part of the first data previously transmitted from an antenna having the worst quality upon reception by a communicating party is included in the data retransmission.

3. The transmission apparatus according to claim 2, wherein the transmission controlling section determines data to be included in the data retransmission, based on information that is transmitted from the communicating party, and indicates data transmitted from which antenna is included in the data retransmission.

4. The transmission apparatus according to claim 1, wherein the transmission controlling section controls the data retransmission such that the data to be included in the data retransmission is retransmitted using an antenna other than the antenna used in previous transmission.

5. The transmission apparatus according to claim 1, wherein when second and subsequent data retransmissions are performed, the transmission controlling section controls data retransmission such that data not previously retransmitted is preferentially included in the data retransmission.

6. The transmission apparatus according to claim 1, wherein the transmission controlling section adaptively changes data amount to be included in the data retransmission according to channel quality upon transmission.

7. The transmission apparatus according to claim 1, wherein when data requiring better quality than other data is transmitted from a specific antenna, the transmission controlling section controls the data retransmission such that data requiring better quality upon retransmission is preferentially included in the data retransmission.

8. The transmission apparatus according to claim 7, wherein the data requiring better quality than the other data is systematic bits when a turbo code is used.

9. A base station apparatus comprising the transmission apparatus according to claim 1.

10. A mobile station apparatus comprising the transmission apparatus according to claim 1.

11. A transmission method of a multi-input multi-output (MIMO) communication scheme that simultaneously transmits different data from a plurality of antennas, the transmission method comprising:
    collectively performing encoding processing on first data to be transmitted from each of the plurality of antennas;
    performing modulation processing on the encoded first data according to each corresponding antenna;
    transmitting the modulated first data from each corresponding antenna; and
    controlling transmission of the modulated first data to be transmitted from each of the plurality of antennas and a data retransmission relating to the first data such that (i) not all of the first data previously transmitted from the plurality of antennas is included in the data retransmission and (ii) data included in the data retransmission excludes any part of the first data previously transmitted from at least one of the plurality of antennas.

12. A transmission apparatus of a multi-input multi-output (MIMO) communication scheme that simultaneously transmits data from a plurality of antennas, the transmission apparatus comprising:
    an encoding section that encodes first data to be transmitted from the plurality of antennas;
    a transmission controlling section that distributes the encoded first data to the plurality of antennas; and
    a transmitting section that transmits the distributed first data from each corresponding antenna, wherein:
    when a data retransmission relating to the first data is performed, the transmission controlling section controls the data retransmission such that data included in the data retransmission (i) includes a part of the distributed data previously transmitted from some antennas of the plurality of antennas and (ii) excludes a part of the distributed data previously transmitted from other antennas of the plurality of antennas.

13. A transmission method of a multi-input multi-output (MIMO) communication scheme that simultaneously transmits data from a plurality of antennas, the transmission method comprising:
    encoding first data to be transmitted from the plurality of antennas;
    distributing the encoded first data to the plurality of antennas;
    transmitting the distributed first data from each corresponding antenna; and
    performing a data retransmission relating to the first data such that data included in the data retransmission (i) includes a part of the distributed data previously transmitted from some antennas of the plurality of antennas and (ii) excludes a part of the distributed data previously transmitted from other antennas of the plurality of antennas.

* * * * *

UNITED STATES PATENT AND TRADEMARK OFFICE
CERTIFICATE OF CORRECTION

PATENT NO. : 7,826,871 B2
APPLICATION NO. : 11/814658
DATED : November 2, 2010
INVENTOR(S) : Hiroaki Sudo It is certified that error appears in the above-identified patent and that said Letters Patent is hereby corrected as shown below:

On the Title page, Item (56), Other Publication section, line 4, incorrectly reads:
"D. Kurose, et al., "A Studt of 0.9V CMOS Biguad Filter", CS2003-"
and should read:
"D. Kurose, et al., "A Study of 0.9V CMOS Biquad Filter", CS2003-"

Signed and Sealed this
Fourteenth Day of February, 2012

David J. Kappos
*Director of the United States Patent and Trademark Office*